(12) United States Patent
Park et al.

(10) Patent No.: US 8,599,343 B2
(45) Date of Patent: Dec. 3, 2013

(54) LIQUID CRYSTAL DISPLAY DEVICE AND METHOD OF MANUFACTURING THE SAME

(75) Inventors: Gyung-Soon Park, Yongin (KR); Kyung-Min Park, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 412 days.

(21) Appl. No.: 12/971,453

(22) Filed: Dec. 17, 2010

(65) Prior Publication Data
US 2011/0222012 A1    Sep. 15, 2011

(30) Foreign Application Priority Data
Mar. 9, 2010    (KR) .................... 10-2010-0021018

(51) Int. Cl.
*G02F 1/1337*    (2006.01)
*G02F 1/1343*    (2006.01)
*G02F 1/1341*    (2006.01)

(52) U.S. Cl.
USPC ........................... 349/129; 349/143; 349/189

(58) Field of Classification Search
USPC ......................................... 349/129, 143, 189
See application file for complete search history.

(56) References Cited

U.S. PATENT DOCUMENTS

| | | | | |
|---|---|---|---|---|
| 8,319,903 B2 * | 11/2012 | Oh et al. | ........................ | 349/39 |
| 2003/0147040 A1 * | 8/2003 | Park et al. | ..................... | 349/187 |
| 2009/0270007 A1 * | 10/2009 | Seok et al. | ..................... | 445/25 |
| 2009/0284700 A1 * | 11/2009 | Kim et al. | ..................... | 349/123 |

FOREIGN PATENT DOCUMENTS

| | | |
|---|---|---|
| JP | 2006-072175 | 3/2006 |
| KR | 10-1999-000186 A | 1/1999 |
| KR | 10-2001-0066560 A | 7/2001 |
| KR | 10-0672638 B1 | 1/2007 |
| KR | 10-2009-0112089 A | 10/2009 |
| KR | 10-2009-0119059 A | 11/2009 |

OTHER PUBLICATIONS

Korean Office action issued by KIPO on Nov. 25, 2011, corresponding to KR 10-2010-0021018 and Request for Entry attached herewith.

* cited by examiner

*Primary Examiner* — Mike Qi
(74) *Attorney, Agent, or Firm* — Robert E. Bushnell, Esq.

(57) ABSTRACT

A liquid crystal display device and a method of manufacturing the same are provided. The liquid crystal display device is manufactured by placing a half tone mask on the assembled first and second substrates in a polymerization process of liquid crystal composition disposed between the first and second substrates. The liquid crystal composition includes liquid crystal molecules and reactive mesogens. The half tone mask has a first transmission part and a second transmission part. The light transmittance of the first transmission part is higher than the light transmittance of the second transmission part. The first transmission part is disposed in the pixel region, while the second transmission part is disposed in the non-pixel region. The non-pixel region is covered by a black matrix that is formed on the second substrate. Through this manufacturing method, the generation of spots around a black matrix is prevented.

16 Claims, 11 Drawing Sheets

LIQUID CRYSTAL DISPLAY DEVICE AND METHOD OF MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office on the 9 Mar. 2010 and there duly assigned Serial No. 10-2010-0021018.

BACKGROUND OF THE INVENTION

1. Field of the Invention

The present invention relates to a liquid crystal display device and a method of manufacturing the same and, more particularly, to a liquid crystal display device in which a liquid crystal domain is formed without forming patterns on an electrode and a method of manufacturing the same.

2. Description of the Related Art

In general, liquid crystal display devices include an array substrate on which switching devices for driving each pixel region are disposed, an opposite substrate facing the array substrate, and a liquid crystal layer disposed between the array substrate and the opposite substrate. The liquid crystal display devices display images when a voltage is applied to the liquid crystal layer to control light transmittance.

A patterned vertical alignment (PVA) mode liquid crystal display device, which is a type of vertical alignment (VA) mode liquid crystal display device, has a structure in which liquid crystal molecules are oriented in directions different from each other by a patterned transparent electrode to form a liquid crystal domain, thereby improving a viewing angle of the PVA mode liquid crystal display device. Thus, to manufacture the PVA mode liquid crystal display device, a process for forming the patterned transparent electrode should be involved.

As described above, since the process of patterning the transparent electrode is further performed to form the liquid crystal domain of the liquid crystal display device, the number of manufacturing processes of the liquid crystal display device increases. Also, in an assembling process of the array substrate and the opposite substrate, the array substrate and the opposite substrate may be misaligned, which causes misalignment of a pixel electrode of the array substrate and patterns of a common electrode of the opposite substrate. As a result, it may be difficult to form a normal liquid crystal domain.

Thus, there is need for a liquid crystal domain formed without forming the patterns on the electrode. For this, the exposure frequency and intensity of ultraviolet (UV) rays onto the liquid crystal layer should be increased when compared to the existing PVA mode liquid crystal display device. However, gas may leak from an organic layer exposed to the UV rays for a long time to generate spots on a screen. In particular, an outgasing phenomenon in which gas leaks may be generated around a position at which a black matrix is disposed, i.e., at an edge of the screen. Thus, to simplify a manufacturing process of the liquid crystal display device, it is necessary to reduce the outgasing phenomenon generated around the black matrix.

SUMMARY OF THE INVENTION

The present invention provides a liquid crystal display device in which a liquid crystal domain is formed without forming a pattern on an electrode to prevent spots from being generated around a black matrix and a method of manufacturing the same.

According to an aspect of the present invention, a method of manufacturing a liquid crystal display device includes: forming a first substrate including a pixel electrode in a pixel region; forming a second substrate including a common electrode facing the pixel electrode and a black matrix covering a non-pixel region; assembling the first and second substrates to have a space formed between the first substrate and the second substrate and sealed by a sealant; injecting a liquid crystal composition comprising liquid crystal molecules into the space; placing a half tone mask on the assembled first and second substrates; and exposing the pixel region and the non pixel region to light through the half tone mask. The half tone mask includes a first transmission part and a second transmission part. The first transmission part is disposed in the pixel region, and the second transmission part is disposed in the non-pixel region. The first transmission part had higher light transmission than the second transmission part.

The exposing the pixel region and the non pixel region includes exposing the pixel region and the non pixel region from the first substrate toward the second substrate. The half tone mask may be disposed on the first substrate.

A light transmittance of the second transmission part may be about a half of the light transmittance of the first transmission part.

The first substrate may further include a domain formation layer including a recessed pattern for forming a liquid crystal domain in the pixel region, and the liquid crystal composition may further include reactive mesogen monomers that are capable of being polymerized through the exposing the pixel region and the non pixel region to light.

The exposing the pixel region and the non pixel region may include: exposing the pixel region and the non pixel region to a first light while a voltage is applied between the pixel electrode and the common electrode; and exposing the pixel region and the non pixel region to a second light while a voltage is not applied between the pixel electrode and the common electrode. The liquid crystal molecules and the reactive mesogen monomers may be irradiated with the first light and the second light.

Each of the first light and the second light may include a ultraviolet ray. An energy of the first light may be about 10 joules to about 15 joules, and the pixel and non-pixel regions may be irradiated for about 6 minutes to about 7 minutes with the first light. An energy of the second light may be greater than about 15 joules, and the pixel and non-pixel regions may be irradiated for about 50 minutes to about 60 minutes with the second light.

The method may further include exposing the sealant to another ultraviolet ray to cure the sealant. An energy of the another ultraviolet ray may be about 3 joules to about 5 joules, and the sealant may be irradiated for about 10 seconds to about 15 seconds with the another ultraviolet ray.

The reactive mesogen monomers may be polymerized into mesogen polymers during the exposing the pixel region and the non pixel region, and the liquid crystal molecules may be arranged along the recessed pattern to form the liquid crystal domain.

The common electrode may not have a pattern for forming the liquid crystal domain.

The sealant region may be shielded during the exposing the pixel region and the non pixel region to light to prevent the sealant from being exposed to the light.

The sealant may be disposed in a portion of the non-pixel region.

According to another aspect of the present invention, a liquid crystal display device includes: a first substrate including a pixel electrode in a pixel region; a second substrate including a common electrode facing the pixel electrode and a light-reflective black matrix covering a non-pixel region; and a liquid crystal layer disposed in a space between the first substrate and the second substrate. The space is sealed by a sealant. the liquid crystal layer includes liquid crystal molecules for forming a liquid crystal domain. When an exposure process for forming the liquid crystal layer is performed, an intensity of light directed onto the non-pixel region increases by a light reflection of the light-reflective black matrix to realize light exposure similar to that in the pixel region.

The first substrate may further include a domain formation layer including a recessed pattern for forming a liquid crystal domain in the pixel region, and the liquid crystal layer may further include reactive mesogen polymers for fixing the liquid crystal molecules.

The common electrode may not have a pattern for forming the liquid crystal domain.

The black matrix may be formed of chrome or organic materials.

The sealant may be disposed in the non-pixel region.

In the liquid crystal display device according the embodiments of the present invention, it may prevent the spots from being generated around the black matrix due to outgasing. Also, since the liquid crystal domain may be formed without forming a separate pattern on the common electrode, a limitation with respect to pattern alignment may be solved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

In general, liquid crystal display devices include an array substrate on which switching devices for driving each pixel region are disposed, an opposite substrate facing the array substrate, and a liquid crystal layer disposed between the array substrate and the opposite substrate. The liquid crystal display devices display images when a voltage is applied to the liquid crystal layer to control light transmittance. A patterned vertical alignment (PVA) mode liquid crystal display device, which is a type of vertical alignment (VA) mode liquid crystal display device, has a structure in which liquid crystal molecules are oriented in directions different from each other by a patterned transparent electrode to form a liquid crystal domain, thereby improving a viewing angle of the PVA mode liquid crystal display device. Thus, to manufacture the PVA mode liquid crystal display device, a process for forming the patterned transparent electrode should be involved.

The present invention will now be described more fully with reference to the accompanying drawings, in which exemplary embodiments of the invention are shown.

First, a structure of a liquid crystal display device in which a liquid crystal domain is formed without forming patterns on a common electrode will be described. Then, when an ultraviolet (UV) exposure process is performed for a long time to manufacture the liquid crystal display device having the structure, a method that prevents spots from being generated by light reflection of a black matrix will be described.

Figure 1:
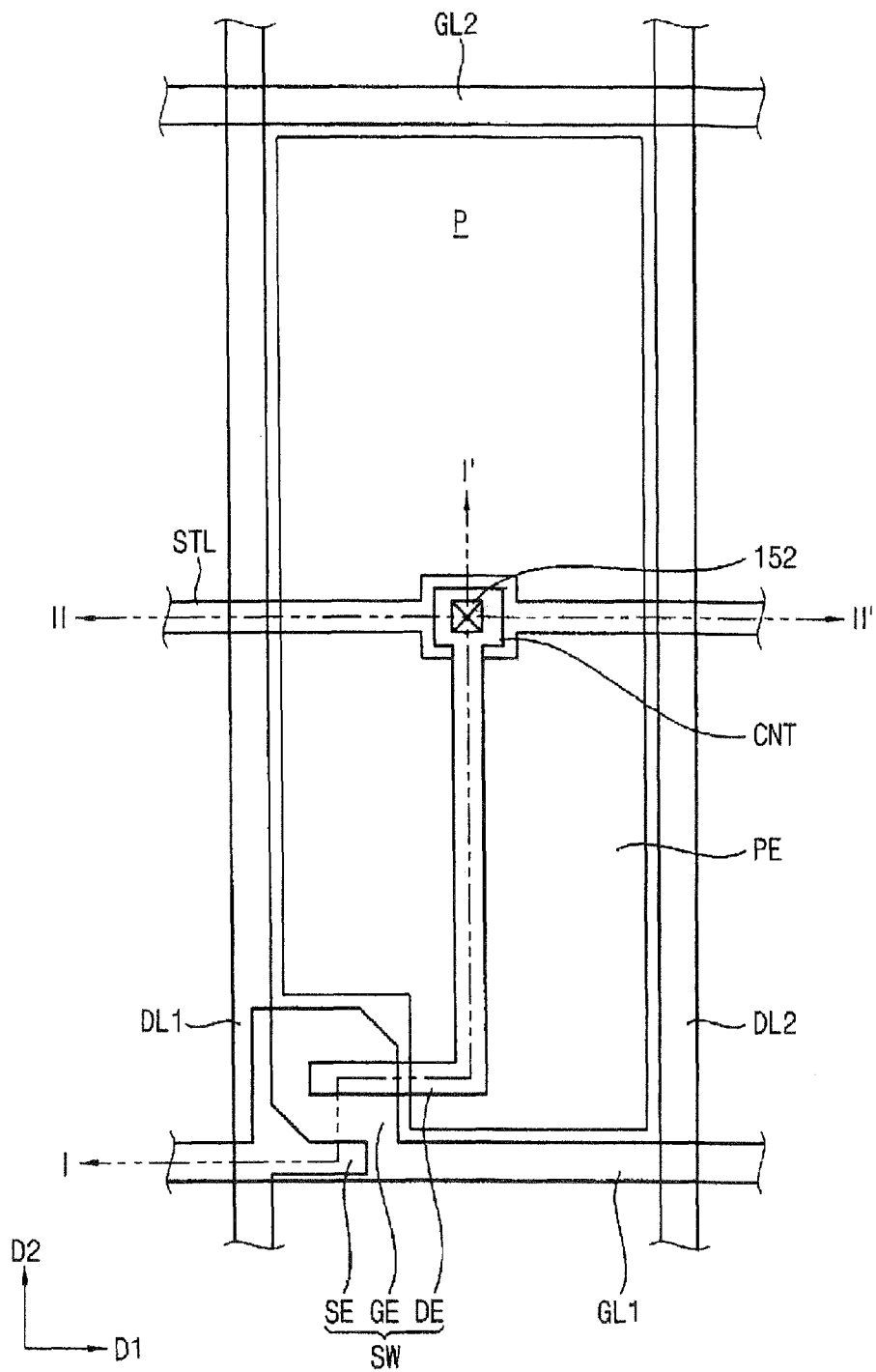
FIG. 1 is a plan view of a liquid crystal display device according to an embodiment of the present invention.
Figure 2A:
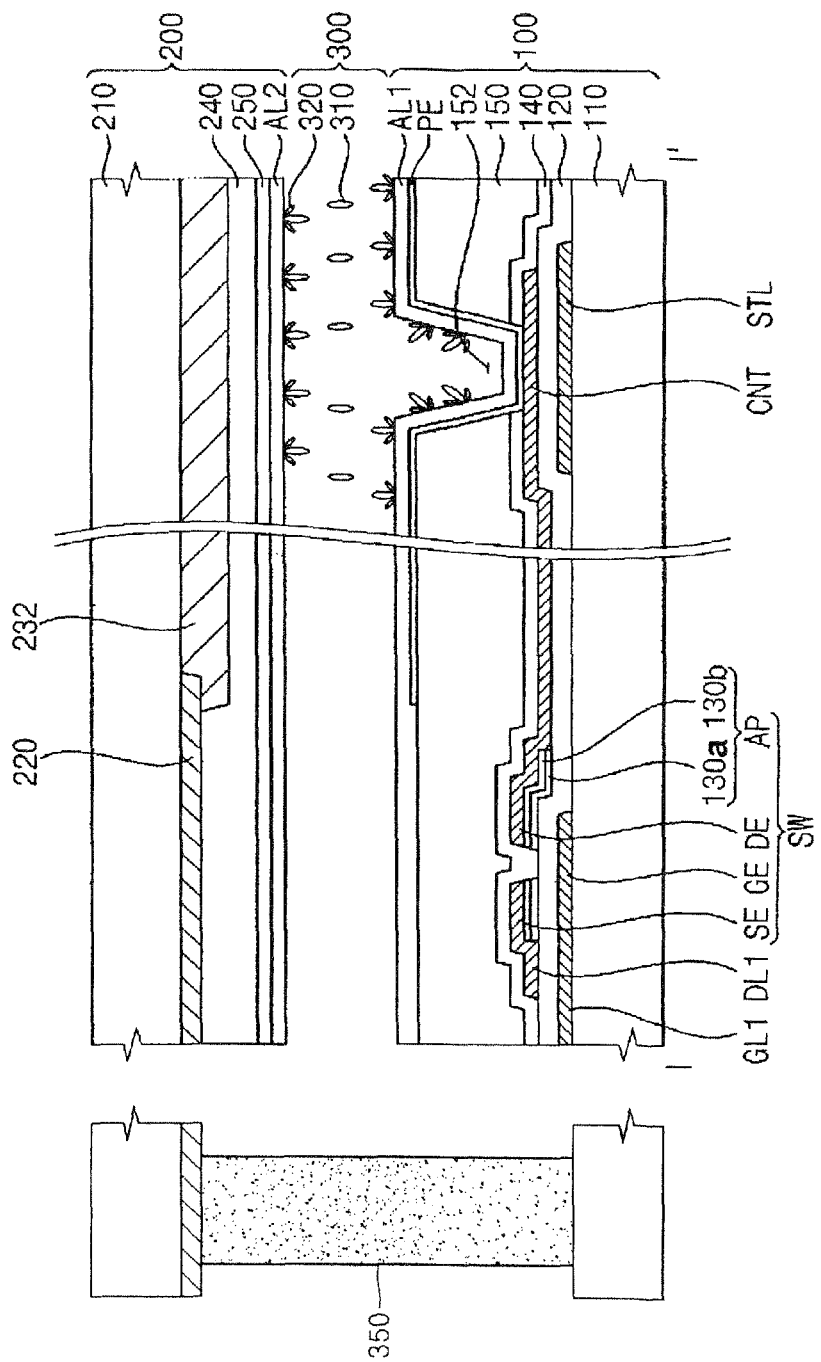
FIG. 2A is a cross-sectional view taken along line I-I' of FIG. 1.
Figure 2B:
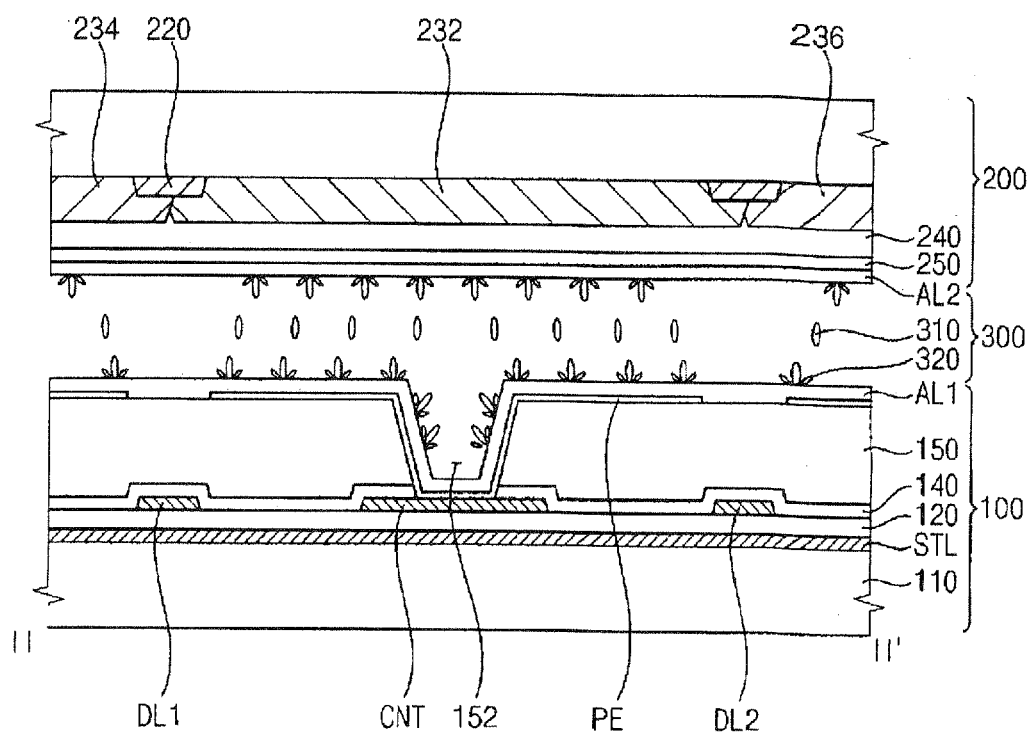
FIG. 2B is a cross-sectional view taken along line II-IP of FIG. 1.

FIG. 1 is a plan view of a liquid crystal display device according to an embodiment of the present invention, FIG. 2A is a cross-sectional view taken along line I-I' of FIG. 1, while FIG. 2B is a cross-sectional view taken along a sectional line II-II' of FIG. 1.

A liquid crystal layer 300 of FIGS. 2A and 2B illustrates states of liquid crystal molecules and reactive mesogens (RMs) under a non-electric field in which a voltage is not applied between a pixel electrode PE and a common electrode 250.

Referring to FIGS. 1, 2A, and 2B together, the liquid crystal display device according to the present embodiment includes a first substrate 100 (or an array substrate), a second substrate 200 (or opposite substrate), and a liquid crystal layer 300.

The first substrate 100 includes a first base substrate 110, first and second gate lines GL1 and GL2, a storage line STL, a gate dielectric 120, first and second data lines DL1 and DL2, a thin film transistor SW that is a switching device, a passivation layer 140, a domain formation layer 150, a pixel electrode PE, and a first alignment layer AL1.

The first and second gate lines GL1 and GL2 may extend along a first direction D1 on the first base substrate 110. The first and second gate lines GL1 and GL2 may be arranged parallel to each other. The second direction D2 may be perpendicular to the first direction D1. The storage line STL may be disposed between the first and second gate lines GL1 and GL2 and extend along the first direction D1. The gate dielectric 120 is disposed on the first base substrate 110 to cover the first and second gate lines GL1 and GL2 and the storage line STL. The first and second data lines DL1 and DL2 may be formed on the gate dielectric 120, and may extend along the second direction D2. The first and second data lines DL1 and DL2 may be arranged parallel to each other. The first and second data lines DL1 and DL2 may cross the first and second gate lines GL1 and GL2 and the storage line STL. A pixel region P is defined in the first substrate 100 by the first and second gate lines GL1 and GL2 and the first and second data lines DL1 and DL2. As shown in FIG. 1, the pixel region P is surrounded by the first and second gate lines GL1 and GL2 and the first and second data lines DL1 and DL2. The pixel electrode PE is disposed on the pixel region P.

The thin film transistor SW may include a gate electrode GE connected to the first gate line GL1, an active pattern AP disposed on the gate dielectric 120 to correspond to the gate electrode GE, a source electrode SE connected to the first data line DL1 and overlapping the active pattern AP, a drain electrode DE spaced from the source electrode SE and overlapping the active pattern AP, and a contact electrode CNT extending from the drain electrode DE to the pixel region P. The active pattern AP may include a semiconductor layer 130a and an ohmic contact layer 130b, which are sequentially disposed on the gate dielectric 120 in the stated order. The contact electrode CNT extends from the drain electrode DE up to the storage line STL and overlaps the storage line STL.

The passivation layer 140 may be disposed on the gate dielectric 120 to cover the first and second data lines DL1 and DL2, the source electrode SE, the drain electrode DE, and the contact electrode CNT.

The domain formation layer 150 may be disposed on the passivation layer 140. The domain formation layer 150 may planarize the first substrate 100. The domain formation layer 150 includes a recessed pattern 152, which includes a recess that is recessed towards the base substrate 110 (downward direction in FIG. 2A) from a surface of the domain formation layer 150. The recessed pattern 152 may be formed in the pixel region P to form a liquid crystal domain in the pixel region P. The recessed pattern 152 may include a dot shape hole and formed in the domain formation layer 150. The recessed pattern 152 may be formed in the contact electrode CNT to overlap with the contact electrode CNT. The recessed pattern 152 may be a dot shape hole exposing a portion of the contact electrode CNT. Even though the recessed pattern 152 has a hole shape, the recessed pattern 152 may prevent light from leaking through a region in which the recessed pattern 152 is disposed due to the storage line STL and the contact electrode CNT, which are disposed below the recessed pattern 152. The domain formation layer 150 may be formed of an organic material or an inorganic material. Alternatively, the domain formation layer 150 may include all of an organic layer and an inorganic layer, and the recessed pattern 152 may be formed in the organic layer or the inorganic layer.

The pixel electrode PE is disposed on the domain formation layer 150 in the pixel region P. The pixel electrode PE may be formed of a transparent and conductive material. The pixel electrode PE may cover the entire recessed pattern 152. Since the pixel electrode PE contacts the contact electrode CNT through the recessed pattern 152, the pixel electrode PE may be electrically connected to the thin film transistor SW. In a region having the same area in plan, the pixel electrode PE disposed in the recessed pattern 152 has an area relatively greater than that of the pixel electrode PE disposed on a flat region of the domain formation layer 150. Thus, when an electric field is formed between the first substrate 100 and the second substrate 200, the electric field intensity of a region adjacent to the recessed pattern 152 may be relatively greater than that of the flat region in which the recessed pattern 152 is not disposed.

The first alignment layer AL1 may be disposed on an entire surface of the first substrate 100, including the pixel electrode PE.

The second substrate 200 includes a second base substrate 210 facing the first substrate 100, a black matrix 220, first, second, and third color filters 232, 234, and 236, an overcoating layer 240, a common electrode 250, and a second alignment layer AL2. The second substrate 200 may not include the overcoating layer 240.

The black matrix 220 may be disposed on a portion of the second base substrate 210, which corresponds to a non-pixel region in which the first and second gate lines GL1 and GL2, the first and second data lines DL1 and DL2, and the thin film transistor SW are disposed. The first, second, and third color filters 232, 234, and 236 may be disposed in regions of the second base substrate 210 partitioned by the black matrix 220. For example, the first color filter 232 may be disposed on the region of the second base substrate 210 corresponding to the pixel region P in which the pixel electrode PE is disposed. The second color filter 234 may be disposed in the first direction D1 of the first color filter 232. The third color filter 236 may be disposed in a direction opposite to the first direction D1 of the first color filter 232. The overcoating layer 240 may be disposed on the second base substrate 210 on which the black matrix 220, the first, second, and third color filters 232, 234, and 236 are disposed. The overcoating layer 240 may planarize the second substrate 200.

The common electrode 250 may be disposed on the overcoating layer 240. The common electrode 250 may be formed of a transparent and conductive material. The common electrode 250 may be disposed on an entire surface of the second substrate 200 without a pattern. That is, the liquid crystal domain of the liquid crystal layer 300 is formed by the pixel electrode PE that may change the electric field intensity by the recessed pattern 152 and the common electrode 250 does not have any pattern. In other words, the surface of the common electrode 250 may be plain and flat.

The second alignment layer AL2 may be disposed on the second base substrate 210 including the common electrode 250. Also, the second alignment layer AL2 may be disposed on the entire surface of the second substrate 200 facing the first substrate 100.

The liquid crystal layer 300 is disposed within a space formed between the first substrate 100 and the second substrate 200. The space is sealed with a sealant 350. The liquid crystal layer 300 includes liquid crystal molecules 310 and reactive mesogen polymers 320 (hereinafter, referred to as a "RM polymer").

The orientations of the liquid crystal molecules 310 may be changed by an electric field foimed between the pixel electrode PE and the common electrode 250 to control light transmittance. For example, the liquid crystal molecules 310 may have anisotropic properties of negative permittivity.

Longitudinal axes of the liquid crystal molecules 310 adjacent to the first substrate 100 and/or the second substrate 200 may be vertically arranged with respect to a surface of the first base substrate 110 and/or the second base substrate 210 when a voltage is not applied between the pixel electrode PE and the common electrode 250. The longitudinal axes of the liquid crystal molecules 310 adjacent to the recessed pattern 152 may be vertically arranged with respect to a surface of the recessed pattern 152. As the recessed pattern 152 has sidewalls and a bottom surface, the liquid crystal molecules 310 in the recessed pattern 152 may be vertically aligned to the surfaces of the sidewalls and the bottom surface of the recessed pattern 152.

The RM polymer 320 may be disposed between the liquid crystal molecules 310. The RM polymer 320 may be disposed between the liquid crystal molecules 310 adjacent to the pixel electrode PE and/or the common electrode 250. Specifically, the RM polymer 320 may be disposed between the liquid crystal molecules 310 adjacent to the first alignment layer AL1. Also, the RM polymer 320 may be disposed between the liquid crystal molecules 310 adjacent to the second alignment layer AL2.

The RM polymer 320 may allow the liquid crystal molecules 310 to be maintained in a pre-tilted state with respect to the surface of the first base substrate 110 and/or the second base substrate 210 even though the electric field is not applied between the pixel electrode PE and the common electrode 250. RM monomers (see reference numeral 330 of FIG. 3E) may be polymerized into a RM polymer by the UV exposure process during the process of manufacturing the liquid crystal display device to form the RM polymer 320.

Figure 2C:
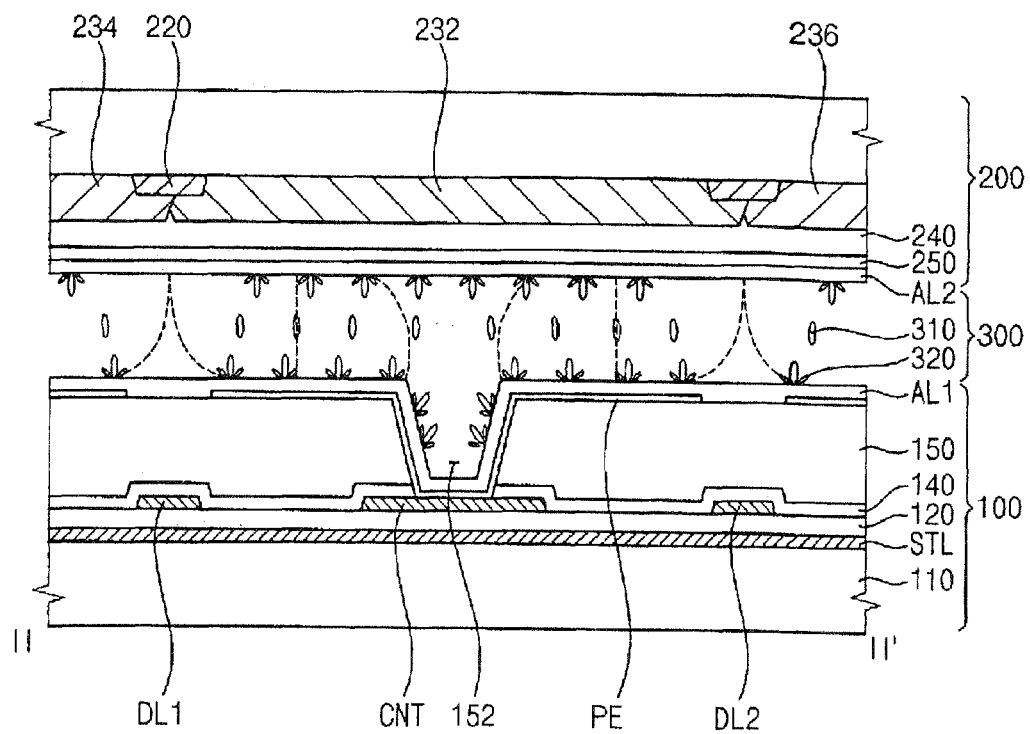
FIG. 2C is a cross-sectional view of the liquid crystal display device when a voltage is applied to the liquid crystal display device of FIG. 2B.

FIG. 2C illustrates a cross-sectional view of the liquid crystal display device when a voltage is applied to the liquid crystal display device of FIG. 2B.

Referring to FIG. 2C, when the electric field is formed between the pixel electrode PE and the common electrode 250, an electric field direction within the pixel region P is perpendicular to that of the surface of the first substrate 100 and/or the second substrate 200.

The electric field direction is bent between an end of the pixel electrode PE and the common electrode 250. Also, the electric field direction is bent between an end of another pixel electrode adjacent to the pixel electrode PE and the common electrode 250. Thus, since the liquid crystal molecules 310 between the pixel electrodes PE adjacent to each other may diverge toward different points of the common electrode 250, the liquid domain may be divided between the pixel regions P adjacent to each other.

The electric field of a region adjacent to the recessed pattern 152 may have a shape converging toward a point of the common electrode 250, e.g., a region of the common electrode 250 corresponding to the recessed pattern 152 due to the pre-tilt by the sidewalls of the recessed pattern 152.

Figure 5A:
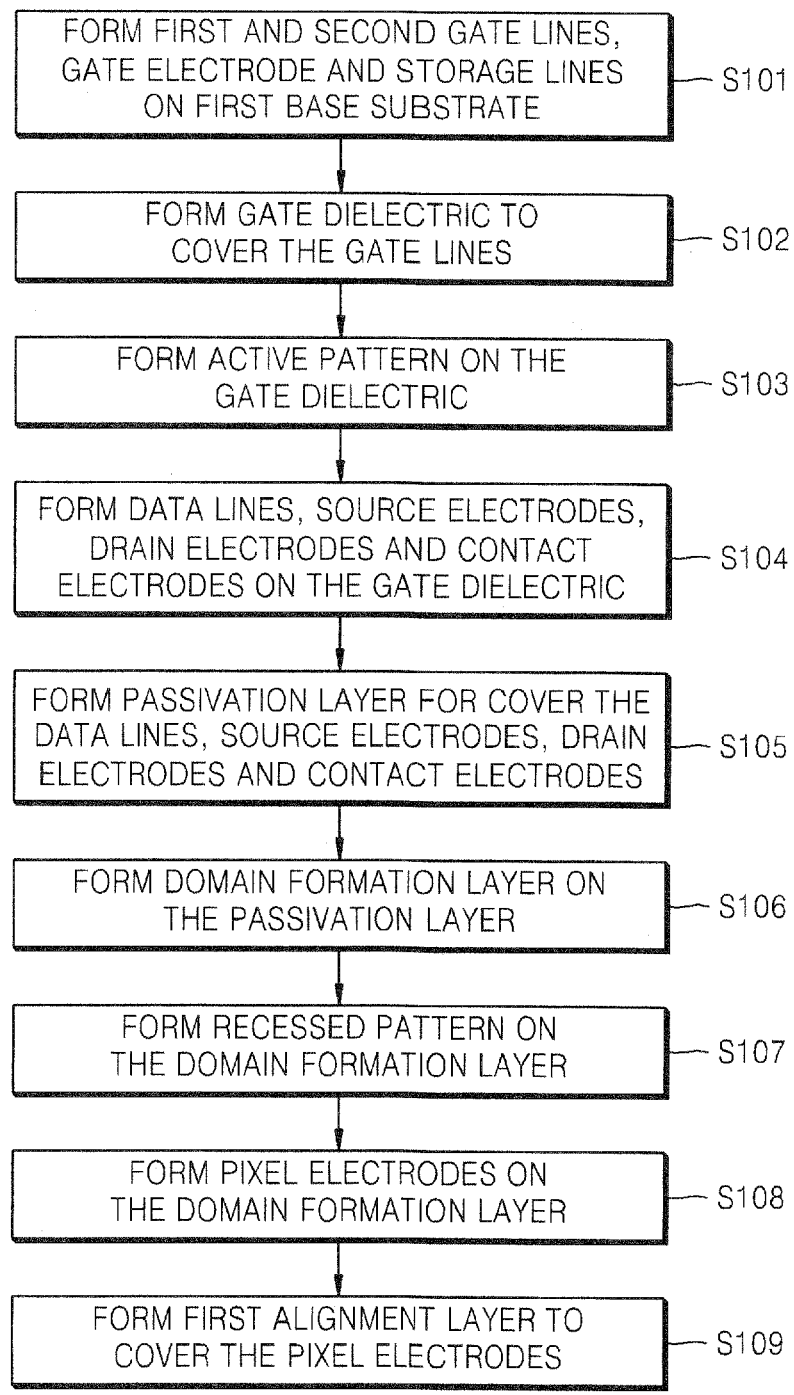
FIGS. 5A to 5C are flowcharts showing the manufacturing process of the liquid crystal display device.
Figure 5B:
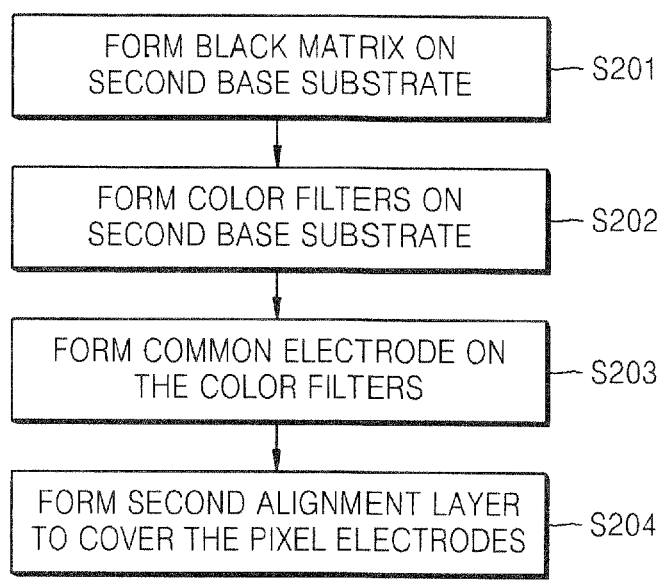
Figure 5C:
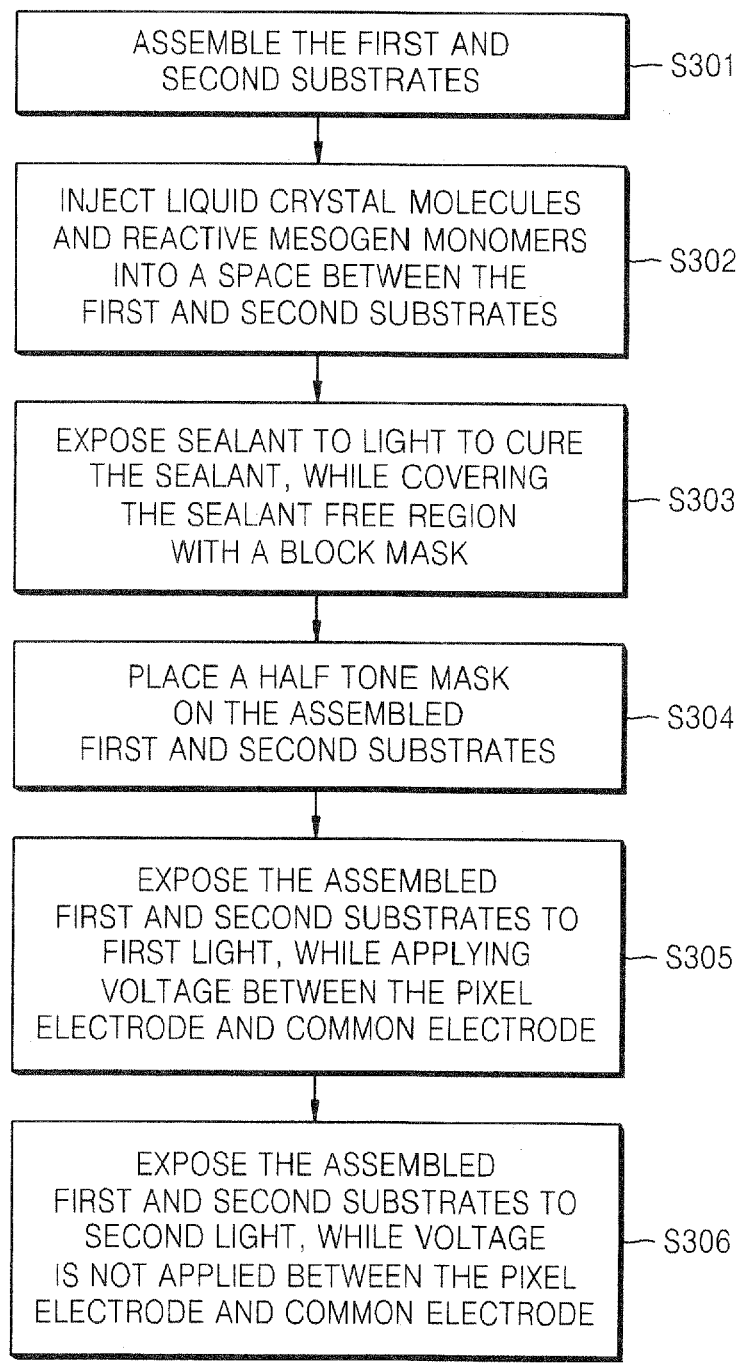

FIGS. 3A to 3E are cross-sectional views illustrating a process of manufacturing the liquid crystal display device of FIG. 2B according to an embodiment of the present invention. FIGS. 5A to 5C are flowcharts showing the manufacturing process of the liquid crystal display device explained referring to FIGS. 3A to 3E.

Although a cross-sectional view taken along a sectional line of FIG. 1 in each manufacturing process of the liquid crystal display device is illustrated in FIGS. 3A to 3E, the present embodiment will be described with reference to FIGS. 1, 2B, and 2C, together with FIGS. 3A to 3E.

Figure 3A:
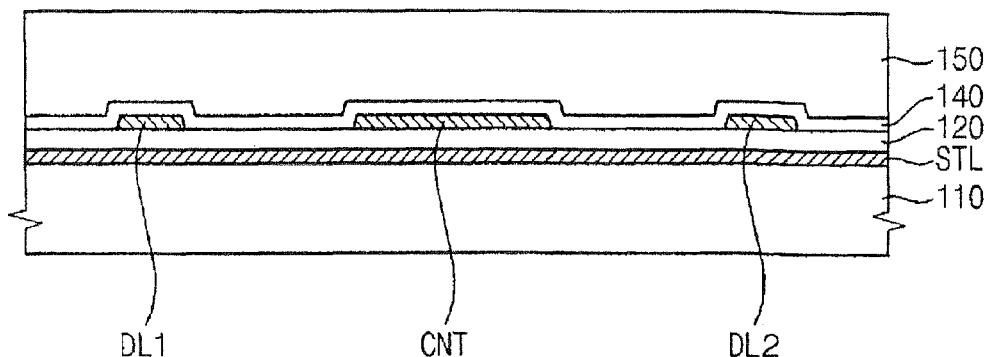
FIGS. 3A to 3E are cross-sectional views illustrating a process of manufacturing the liquid crystal display device of FIG. 2B according to an embodiment of the present invention.
Figure 3B:
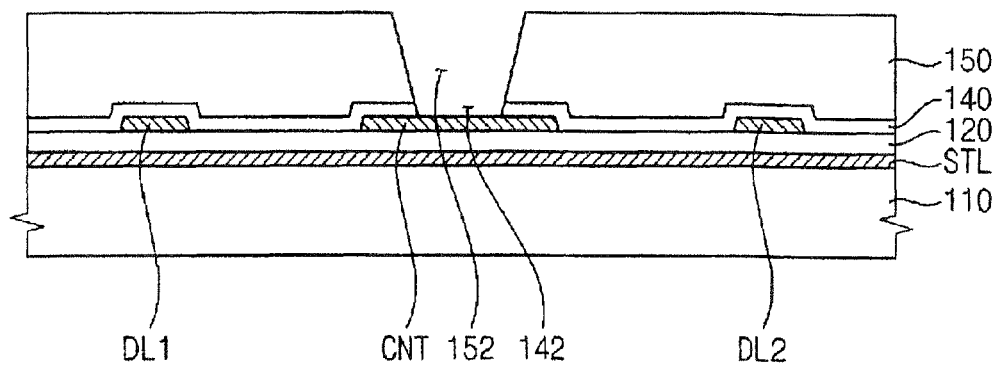
Figure 3C:
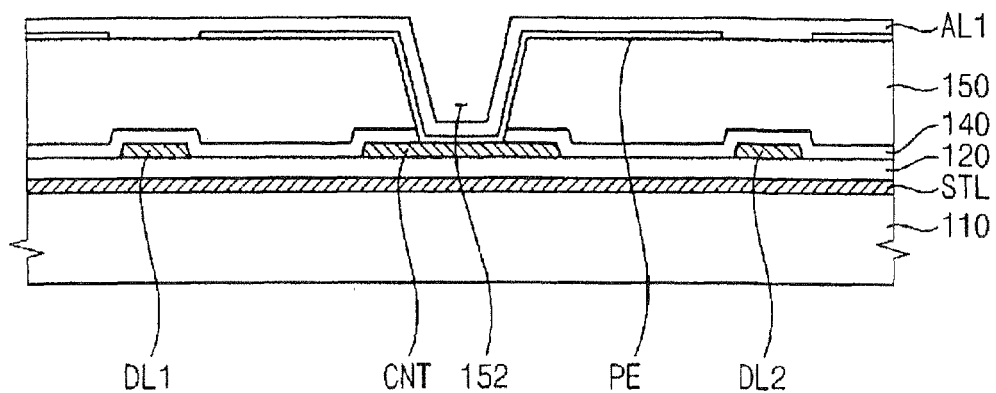

FIGS. 3A to 3C are cross-sectional views for explaining a process of manufacturing the first substrate 100 of FIG. 2B. FIG. 5A is a flowchart showing the manufacturing process of the first substrate 100 explained referring to FIGS. 3A to 3C.

Referring to FIGS. 3A and 5A, a gate metal layer (not shown) is formed on the first base substrate 110. The gate metal layer is patterned by a photolithography process to form gate patterns including the first and second gate lines GL1 and GL2, the gate electrode GE, and the storage line STL (S101).

The gate dielectric 120 is formed on the first base substrate 110 including the gate patterns (S102). The gate dielectric 120 may be formed of silicon oxide or silicon nitride.

The active pattern AP is formed on the first base substrate 110 including the gate dielectric 120 (S103). The semiconductor layer 130a and the ohmic contact layer 130b may be sequentially formed on the gate dielectric 120 in the stated order. For example, the semiconductor layer 130a may include amorphous silicon, and the ohmic contact layer 130b may include amorphous silicon doped with n-type impurities at high concentration.

A data metal layer (not shown) is formed on the first base substrate 110 including the active pattern AP. The data metal layer is patterned by a photolithography process to form source patterns including the first and second data lines DL1 and DL2, the source electrode SE, the drain electrode DE, and the contact electrode CNT (S104).

The passivation layer 140 and the domain formation layer 150 are sequentially formed on the first base substrate 110 including the source patterns in the stated order (S105 and S106). The passivation layer 140 may be formed of silicon oxide or silicon nitride. The domain formation layer 150 may be formed of an organic material such as a positive photoresist composition or a negative photoresist composition or an inorganic material such as silicon oxide or silicon nitride.

Referring to FIG. 3B, the domain formation layer 150 is patterned to form the recessed pattern 152 (S107). The recessed pattern 152 may be formed at a location corresponding to the contact electrode CNT. The contact electrode CNT may overlap the storage line STL. The recessed pattern 152 may be a hole exposing a portion of the passivation layer 140 formed on the contact electrode CNT.

The passivation layer 140 exposed through the recessed pattern 152 is removed to form a passivation hole 142. The passivation hole 142 is formed at a location corresponding to the contact electrode CNT. A portion of the contact electrode CNT may be exposed through the passivation hole 142 and the recessed pattern 152.

Referring to FIG. 3C, a transparent electrode layer (not shown) is formed on the first base substrate 110 including the domain formation layer 150 in which the recessed pattern 152 is formed. The transparent electrode layer is patterned to form the pixel electrode PE (S108). The transparent electrode layer may be formed of Indium tin oxide (ITO) or Indium zinc oxide (IZO).

The first alignment layer AL1 is formed on the first base substrate 110 including the pixel electrode PE (S109). The first alignment layer AU may include a vertical alignment material that may vertically align the liquid crystal molecules 310.

Thus, the first substrate 100 according to the embodiment including the gate patterns, the gate dielectric 120, the active pattern AP, the source patterns, the passivation layer 140, the domain formation layer 150 including the recessed pattern 152, the pixel electrode PE, and the first alignment layer AL1 may be manufactured.

Figure 3D:
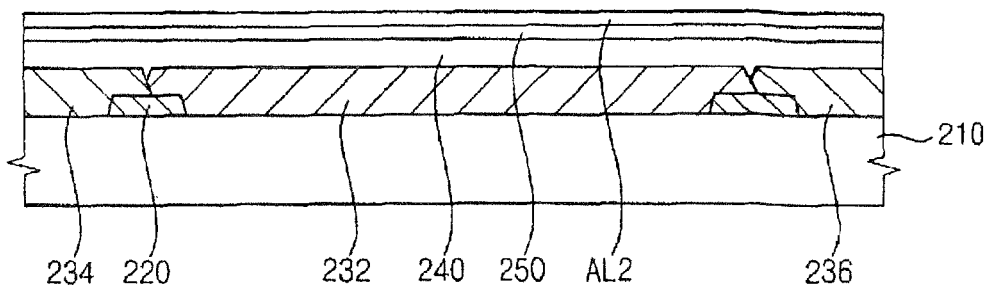

FIG. 3D is a cross-sectional view of explaining a process of manufacturing the second substrate 200 of FIG. 2B according to an embodiment of the present invention. FIG. 5B is a flowchart showing the manufacturing process of the second substrate 200 explained referring to FIG. 3D.

Referring to FIGS. 3D and 5B, the black matrix 220 is formed on the second base substrate 210 (S201). The black matrix 220 may be formed by spraying organic ink, or a metal layer may be patterned by a photolithography process to form the black matrix 220. The black matrix 220 may be formed between the first, second, and third color filters 232, 234, and 236 and on a circumference corresponding to an edge of a screen.

The first, second, and third color filters 232, 234, and 236 are formed on the second base substrate 210 including the black matrix 220 (S202). For example, the first color filter 232 may be formed, and the second color filter 234 may be formed on the second base substrate 210 including the first color filter 232. Then, the third color filter 236 may be formed on the second base substrate 210 including the first and second color filters 232 and 234. A color photoresist layer may be patterned by a photolithography process to form the first, second and third color filters 232, 234, and 236, or color ink may be sprayed to form the first to third color filters 232, 234, and 236.

The overcoating layer 240 may be formed on the second base substrate 210 including the black matrix 220 and the first to third color filters 232, 234, and 236. The overcoating layer 240 may be formed of an acrylic resin.

A transparent electrode layer (not shown) may be formed on the second base substrate 210 including the overcoating layer 240 to form the common electrode 250 (S203). The common electrode 250 may cover the entire surface of the second base substrate 210 without patterning the transparent electrode layer. The common electrode 250 may be formed of ITO or IZO.

The second alignment layer AL2 may be formed on the second base substrate 210 including the common electrode 250 (S204). The second alignment layer AL2 may cover the entire surface of the second base substrate 210 including the common electrode 250.

Thus, the second substrate 200 according to the embodiment including the black matrix 220, the first to third color filters 232, 234, and 236, the overcoating layer 240, and the second alignment layer AL2 may be manufactured.

Figure 3E:
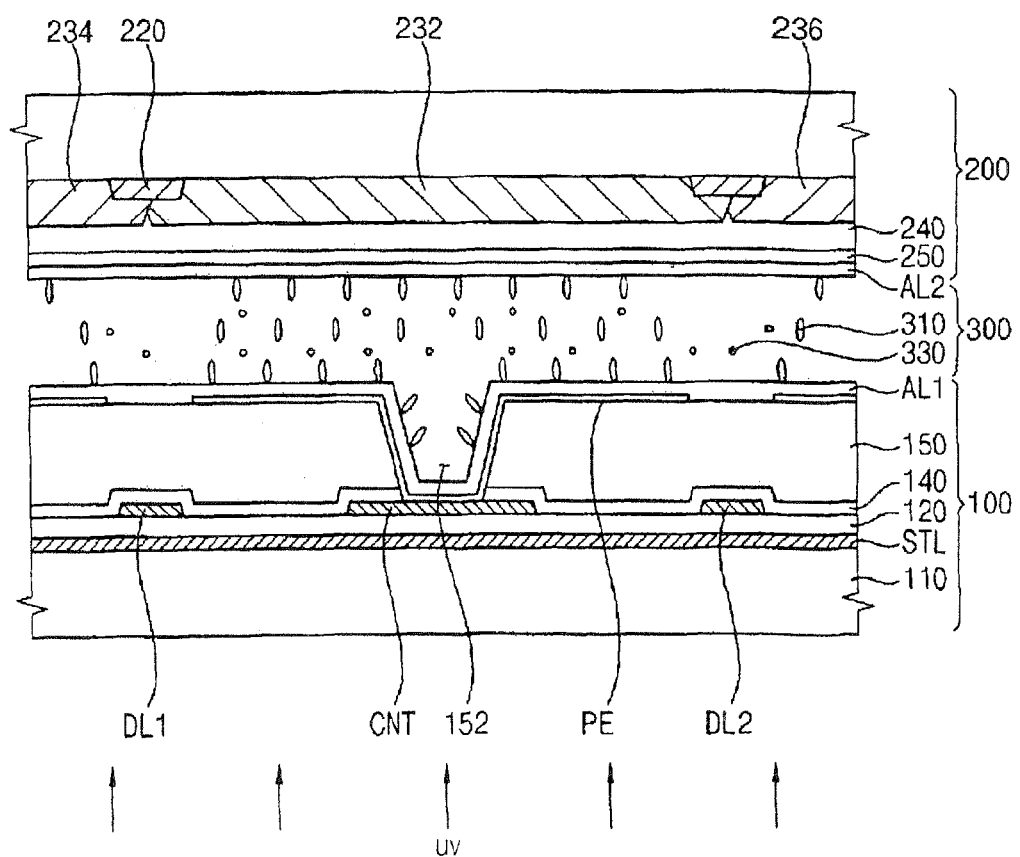

FIG. 3E is a cross-sectional view for explaining an exposure process of forming the liquid crystal layer 300 of FIG. 2B according to an embodiment of the present invention. FIG. 5C is a flowchart showing the exposure process of the liquid crystal layer 300 explained referring to FIG. 3E.

Referring to FIG. 3E, the first substrate 100 and the second substrate 200 are assembled. The liquid crystal molecules 310 and the reactive mesogen (RM) monomers 330 are disposed between the first substrate 100 and the second substrate 200. The liquid crystal molecules 310 and the RM monomers 330 may be randomly oriented between the first substrate 100 and the second substrate 200.

Then, a first voltage Vcom is applied to the common electrode 250, and a second voltage Vdata different from the first voltage Vcom is applied to the pixel electrode PE. When the first voltage Vcom is applied to the common electrode 250 and the second voltage Vdata is applied to the pixel electrode PE, an electric field is formed between the pixel electrode PE and the common electrode 250. When the electric field is formed, the longitudinal axes of the liquid crystal molecules 310 are oriented in a direction perpendicular to the electric field direction.

The first voltage Vcom may have a level greater than that of the second voltage Vdata. In particular, the first voltage Vcom may be about 0 V, and the second voltage Vdata may have a negative value. For example, the second voltage Vdata may be about −5 V.

When the electric field is formed between the first substrate 100 and the second substrate 200 to tilt the liquid crystal molecules 310, light is directed onto the first substrate 100 and the second substrate 200. That is, the assembly of the first substrate 100 and the second substrate 200 is exposed to the light, and an electric field exposure process is performed. For example, the light may be ultraviolet (UV) rays. The RM monomers 330 may photo-react and be polymerized by the light to form the RM polymer 320 disposed between the liquid crystal molecules 310. Then, a non-electric field exposure process in which the electric field is not applied is performed to locate the liquid crystal domain. Thus, the liquid crystal layer 300 disposed between the first substrate 100 and the second substrate 200 according to the embodiment may be formed.

As described above, when the exposure process is performed, since spots may occur around the non-pixel region covered by the black matrix 220, a method that prevents the spots from being generated during the exposure process will now be described with reference to FIGS. 4A to 4C and FIG. 5C.

Three exposure processes, i.e., the electric field exposure process, the non-electric field exposure process, and a sealant cure process that cures the sealant 350 are performed during the manufacturing process of the liquid crystal display device.

Figure 4A:
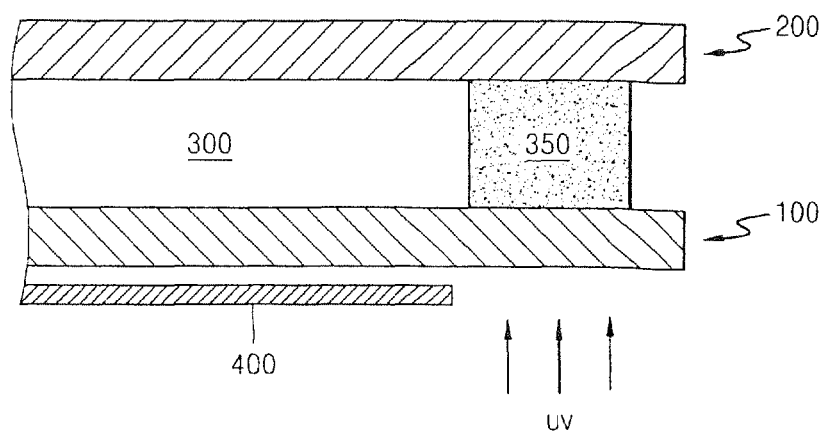
FIGS. 4A to 4C are cross-sectional views illustrating an exposure process in the process of manufacturing the liquid crystal display device of FIG. 2B.

After the first substrate 100 and the second substrate 200 are assembled (S301), the liquid crystal molecules 310 and reactive mesogen (RM) monomers 330 (see FIG. 3E) are injected into a space sealed by the sealant 350 (S302), First, an exposure process that cures the sealant 350 for sealing the liquid crystal layer 300 is performed. In this process, the sealant 350 is exposed to a ultraviolet light to cure the sealant 350 through an UV exposure process (S303). Here, as shown in FIG. 4A, the sealant-free region is covered by a UV block mask 400 to direct the UV rays only on a region in which the sealant 350 is formed. Here, the region in which the sealant 350 is formed may be the non-pixel region. Thus, since only the sealant 350 is exposed to the UV rays having energy of about 3 joules to about 5 joules for about 10 seconds to about 15 seconds, the generation of spots due to outgasing of the organic material may be prevented.

As described above, the electric field exposure process and the non-electric field exposure process are performed to form the liquid crystal domain of the liquid crystal layer 300. Here, the outgasing may occur in the non-pixel region in which the black matrix is disposed. This is done because the black matrix 220 includes a reflective material such as chrome or organic materials that reflect the UV rays applied during the exposure process, thereby allowing the reflected UV rays to return to the non-pixel region. Thus, when the same amount of light as that of the pixel region is applied, the non-pixel region has a relatively larger amount of light. In particular, in the structure in which the liquid crystal domain is formed using only the recessed pattern 152 without a pattern on the common electrode 250, since two exposure processes, i.e., the electric field exposure process and the non-electric field exposure process, are performed to form the liquid crystal layer 300 and also a total exposure time increases to increase the amount of light, the outgasing may worsen. When the electric field exposure process is performed, the UV rays (first light) are applied with energy of about 10 joules to about 15 joules for about 6 minutes to about 7 minutes using a mercury lamp as a light source. When the non-electric field exposure process is performed, the UV rays (second light) are irradiated with energy greater than about 15 joules for about 50 minutes to about 60 minutes using a fluorescent lamp as a light source.

Figure 4B:
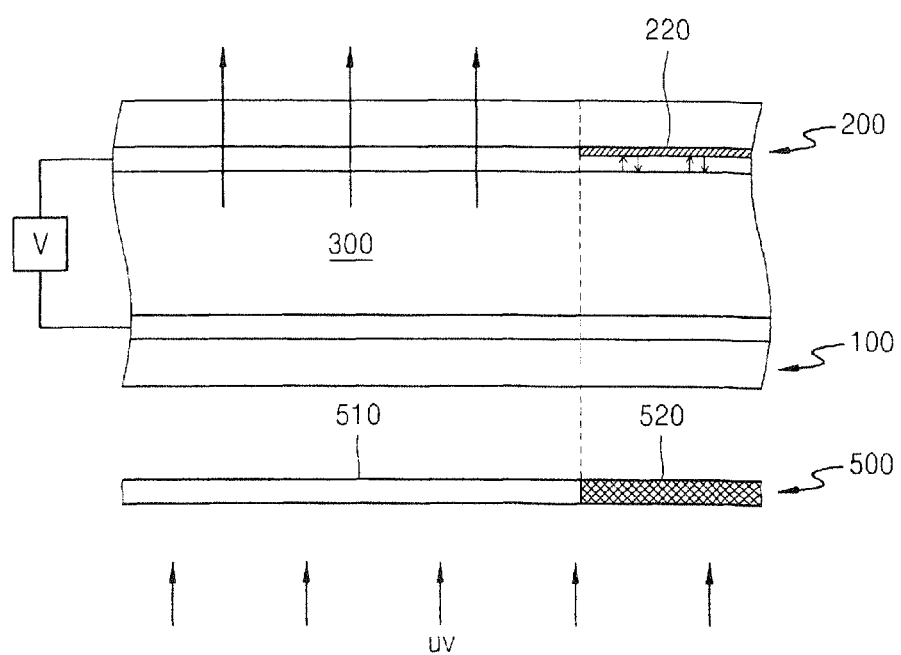
Figure 4C:
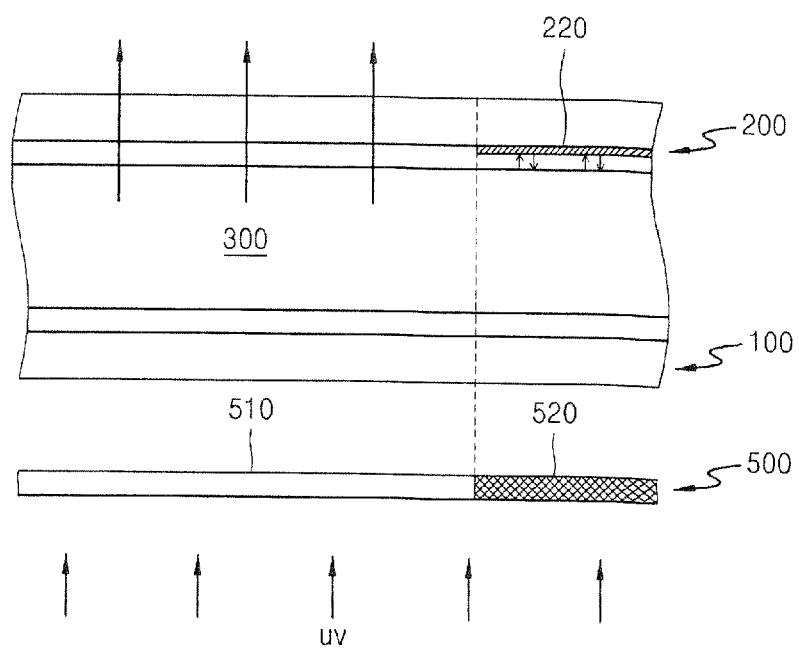

Thus, to solve the above-described limitation, a half tone mask 500 is used as shown in FIGS. 4B and 4C. The half tone mask 500 is placed on the assembled first and second substrates (S304). The half tone mask 500 includes a first transmission part 510 and a second transmission part 520. Through the first transmission part 510, substantially all amount of light is transmitted through the pixel region in which the black matrix 220 is not disposed, and through the second transmission part 520, about a half of the amount of the light is transmitted through the non-pixel region in which the black matrix 220 is disposed. Thus, when the UV rays are applied onto the first substrate 100 using the haft tone mask 500 as a mask, the amount of light applied in the non-pixel region is reduced. However, since the black matrix 220 reflects the UV rays to allow the UV rays to return to the non-pixel region, the actual amount of light in the non-pixel region is similar to that of the pixel region. Thus, considering light reflectance of the black matrix 220, the UV rays may be applied onto the non-pixel region with a amount of light similar to that of the pixel region to reduce the outgasing. For example, if the black matrix 220 reflects UV rays having a wavelength of greater than about 300 nm by about 50% under an exposure condition, the light reflectance of the second transmission part 520 is less than that of the first transmission part 510. As a result, the pixel region and the non-pixel region may have substantially the same amount of light, and the outgasing is prevented from being generated by an excessive light quantity in the non-pixel region.

As shown in FIG. 4B and described referring to FIG. 3E, a first voltage Vcom is applied to the common electrode 250, and a second voltage Vdata different from the first voltage Vcom is applied to the pixel electrode PE. When the first voltage Vcom is applied to the common electrode 250 and the second voltage Vdata is applied to the pixel electrode PE, an electric field is formed between the pixel electrode PE and the common electrode 250. Then, the assembly of the first substrate 100 and the second substrate 200 is exposed to a first light through the half tone mask 500 (S305).

Then, as shown in FIG. 4C, a non electric field exposure process, in which voltages are not applied to the pixel electrode PE and the common electrode 250, is performed to locate the liquid crystal domain. The assembly of the first substrate 100 and the second substrate 200 is exposed to a second light through the half tone mask 500 (S306), while voltage is not applied between the pixel electrode PE and the common electrode 250. Thus, the liquid crystal layer 300 disposed between the first substrate 100 and the second substrate 200 according to the embodiment may be formed.

Also, when the electric field exposure process and the non-electric field exposure process are performed, the outgasing may occur at the sealant 350 due to a long exposure time. Thus, a region of the sealant 350 may be covered by the UV block mask 400 to prevent the sealant 350 from being exposed to the UV rays.

According to the above-described embodiment, since the liquid crystal domain may be formed by the recessed pattern 152 of the domain formation layer 150 without forming a separate pattern on the common electrode 250, the generation of spots around the black matrix due to the outgasing may be prevented.

Also, since the separate pattern is not formed on the common electrode 250, the first substrate 100 and the second substrate may be prevented from being misaligned. In addition, since a separate patterning process for patterning the common electrode 250 is omitted, the manufacturing process may be simplified.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of manufacturing a liquid crystal display device, the method comprising:
    forming a first substrate comprising a pixel electrode formed in a pixel region;
    forming a second substrate comprising a common electrode facing the pixel electrode and a black matrix covering a non-pixel region;
    assembling the first and second substrates, a space formed between the first substrate and the second substrate, the space sealed by a sealant;
    injecting a liquid crystal composition comprising liquid crystal molecules into the space;
    placing a half tone mask on the assembled first and second substrates, the half tone mask comprising a first transmission part and a second transmission part, the first transmission part being disposed in the pixel region, the second transmission part being disposed in the non-pixel region, the first transmission part having higher light transmission than the second transmission part; and
    exposing the pixel region and the non-pixel region to light through the half tone mask.

2. The method of claim 1, wherein the exposing of the pixel region and the non-pixel region comprises exposing the pixel region and the non-pixel region from the first substrate toward the second substrate, the half tone mask being disposed on the first substrate.

3. The method of claim 1, wherein a light transmittance of the second transmission part is about a half of the light transmittance of the first transmission part.

4. The method of claim 1, wherein the first substrate further comprises a domain formation layer comprising a recessed pattern for forming a liquid crystal domain in the pixel region, and the liquid crystal composition further comprises reactive mesogen monomers that are capable of being polymerized through the exposing of the pixel region and the non-pixel region to light.

5. The method of claim 4, wherein the exposing the pixel region and the non-pixel region comprises:
    exposing the pixel region and the non-pixel region to a first light while a voltage is applied between the pixel electrode and the common electrode, the liquid crystal molecules and the reactive mesogen monomers being irradiated with the first light; and
    exposing the pixel region and the non-pixel region to a second light while a voltage is not applied between the pixel electrode and the common electrode, the liquid crystal molecules and the reactive mesogen monomers being irradiated with the second light.

6. The method of claim 5, wherein each of the first light and the second light includes a ultraviolet ray, an energy of the first light being about 10 joules to about 15 joules and the pixel and non-pixel regions being irradiated for about 6 minutes to about 7 minutes with the first light, an energy of the second light being greater than about 15 joules and the pixel and non-pixel regions being irradiated for about 50 minutes to about 60 minutes with the second light.

7. The method of claim 6, further comprising exposing the sealant to another ultraviolet ray to cure the sealant, an energy of the another ultraviolet ray being about 3 joules to about 5 joules and the sealant being irradiated for about 10 seconds to about 15 seconds with the another ultraviolet ray.

8. The method of claim 4, wherein the reactive mesogen monomers are polymerized into mesogen polymers during the exposing the pixel region and the non-pixel region, and the liquid crystal molecules are arranged along the recessed pattern to form the liquid crystal domain.

9. The method of claim 4, wherein the common electrode does not have a pattern for forming the liquid crystal domain.

10. The method of claim 1, wherein the sealant is shielded during the exposing the pixel region and the non-pixel region to light to prevent the sealant from being exposed to the light.

11. The method of claim 1, wherein the sealant is disposed in a portion of the non-pixel region.

12. A liquid crystal display device, comprising:
    a first substrate comprising a pixel electrode in a pixel region;
    a second substrate comprising a common electrode facing the pixel electrode and a light reflective black matrix covering a non-pixel region; and
    a liquid crystal layer disposed in a space between the first substrate and the second substrate, the space being sealed by a sealant, the liquid crystal layer comprising liquid crystal molecules for forming a liquid crystal domain, wherein, when an exposure process for forming the liquid crystal layer is performed, an intensity of light directed onto the non-pixel region increases by a light reflection of the light reflective black matrix to realize light exposure similar to that in the pixel region.

13. The liquid crystal display device of claim 12, wherein the first substrate further comprises a domain formation layer comprising a recessed pattern for forming a liquid crystal domain in the pixel region, and the liquid crystal layer further comprises reactive mesogen polymers for fixing the liquid crystal molecules.

14. The liquid crystal display device of claim 13, wherein the common electrode does not have a pattern for forming the liquid crystal domain.

15. The liquid crystal display device of claim 12, wherein the black matrix is formed of chrome or organic materials.

16. The liquid crystal display device of claim 12, wherein the sealant is disposed in the non-pixel region.

* * * * *